US008510341B2

(12) United States Patent
Weinberg et al.

(10) Patent No.: US 8,510,341 B2
(45) Date of Patent: *Aug. 13, 2013

(54) SYSTEM, METHOD AND STRUCTURES FOR A REUSABLE CUSTOM-DEFINED NESTABLE COMPOUND DATA TYPE FOR CONSTRUCTION OF DATABASE OBJECTS

(75) Inventors: Paul N. Weinberg, Los Angeles, CA (US); Dave L. Sullivan, Canoga Park, CA (US); Eugene Cherny, Sherman Oaks, CA (US)

(73) Assignee: SAP AG, Walldorf (DE)

( * ) Notice: Subject to any disclaimer, the term of this patent is extended or adjusted under 35 U.S.C. 154(b) by 784 days.

This patent is subject to a terminal disclaimer.

(21) Appl. No.: 12/275,934

(22) Filed: Nov. 21, 2008

(65) Prior Publication Data

US 2010/0131568 A1    May 27, 2010

(51) Int. Cl.
*G06F 7/00* (2006.01)
*G06F 17/30* (2006.01)

(52) U.S. Cl.
USPC .......................................... 707/794; 707/793

(58) Field of Classification Search
None
See application file for complete search history.

(56) References Cited

U.S. PATENT DOCUMENTS

| | | | | |
|---|---|---|---|---|
| 5,819,086 | A * | 10/1998 | Kroenke | 1/1 |
| 6,609,123 | B1 * | 8/2003 | Cazemier et al. | 1/1 |
| 6,643,633 | B2 * | 11/2003 | Chau et al. | 1/1 |
| 6,704,747 | B1 * | 3/2004 | Fong | 1/1 |
| 7,640,267 | B2 * | 12/2009 | Spivack et al. | 1/1 |
| 7,822,786 | B2 * | 10/2010 | Charlet et al. | 707/809 |
| 2003/0074419 | A1 * | 4/2003 | VanderDrift | 709/218 |
| 2004/0015783 | A1 * | 1/2004 | Lennon et al. | 715/523 |
| 2004/0093344 | A1 * | 5/2004 | Berger et al. | 707/102 |
| 2005/0080808 | A1 * | 4/2005 | Hailey et al. | 707/102 |
| 2005/0228768 | A1 * | 10/2005 | Thusoo et al. | 707/1 |
| 2006/0294098 | A1 * | 12/2006 | Thomson et al. | 707/6 |
| 2008/0263033 | A1 * | 10/2008 | Vailaya et al. | 707/6 |
| 2008/0275907 | A1 * | 11/2008 | Han et al. | 707/102 |
| 2008/0301168 | A1 * | 12/2008 | Adler et al. | 707/102 |
| 2009/0254601 | A1 * | 10/2009 | Moeller et al. | 709/201 |

OTHER PUBLICATIONS

Jiang et al. "Mapping-Driven XML Transformation" WWW 2007, May 8-12, 2007, Banff, Alberta, Canada.*
Yunsheng Liu, Hao Zhong, Yi Wang "Capturing XML Constraints with Relational Schema" 2004 IEEE.*

* cited by examiner

*Primary Examiner* — Polina Peach
(74) *Attorney, Agent, or Firm* — Buckley, Maschoff & Talwalker LLC (57) ABSTRACT

The reusable custom-defined nestable compound data type for construction of database objects of one or more embodiments of the invention provide advantages over traditional non-reusable structured tables of RDBM systems. The data structure of one or more embodiments of the invention may be thought of in part as a generalized form of a user defined compound data type that may be used to model various "exotic" data structures, such as flexible hierarchies and networks, in database schema. Thus, the system, methods and data structures of one or more embodiments of the invention may be used to define and instantiate structures that support the creation of flexible nested records that expose the relationship between parent records and private child sub-records in a database schema.

3 Claims, 10 Drawing Sheets

Prior Art

FIGURE 2A  Prior Art

Customers Table

| ID | Name |
|---|---|
| 1001 | Joe's Pizza |
| 1002 | Mike's Subs |
| 1003 | Happy Burger |
| | |

Address Table

| ADDRESS | | | | |
|---|---|---|---|---|
| Street | City | State | Zip | Country |
| 101 Main Street | Anytown | CA | 90000 | USA |
| P.O. Box 1234 | Anytown | CA | 90000 | USA |
| 1001 Oak Blvd. | Mytown | NY | 10000 | USA |
| 555 Jay Ave. | Beantown | MA | 60000 | USA |
| | | | | |
| | | | | |

SYSTEM, METHOD AND STRUCTURES FOR A REUSABLE CUSTOM-DEFINED NESTABLE COMPOUND DATA TYPE FOR CONSTRUCTION OF DATABASE OBJECTS

CROSS-REFERENCES TO RELATED APPLICATIONS

This application claims the benefit of the filing date of U.S. patent application Ser. No. 12/276,009 entitled "METHOD FOR CREATING A SELF-CONFIGURING DATABASE SYSTEM USING A REUSABLE CUSTOM-DEFINED NESTABLE COMPOUND DATA TYPE," filed Nov. 21, 2008; U.S. patent application Ser. No. 12/275,942 entitled "METHOD FOR GENERATING AND USING REUSABLE CUSTOM-DEFINED NESTABLE COMPOUND DATA TYPE AS DATABASE QUALIFIERS," filed Nov. 21, 2008; U.S. patent application Ser. No. 12/276,055 entitled "METHOD OF REPRESENTING AN XML SCHEMA DEFINITION AND DATA WITHIN A RELATIONAL DATABASE MANAGEMENT SYSTEM USING A REUSABLE CUSTOM-DEFINED NESTABLE COMPOUND DATA TYPE," filed Nov. 21, 2008; and U.S. patent application Ser. No. 12/276,096 entitled "METHODS AND STRUCTURES FOR UTILIZING REUSABLE CUSTOM-DEFINED NESTABLE COMPOUND DATA TYPES TO PERMIT PRODUCT VARIATIONS WITHIN AN EXISTING TAXONOMY," filed Nov. 21, 2008; are all hereby incorporated herein by reference.

BACKGROUND OF THE INVENTION

1. Field of the Invention

Embodiments of the invention described herein pertain to the field of computer databases. More particularly, but not by way of limitation, one or more embodiments of the invention enable a system, method and structures for a reusable custom-defined nestable compound data type for construction of database objects.

2. Description of the Related Art

Early computer database models required designers to access data through low level pointer operations that linked records through physical addresses. Querying the database required an understanding of the physical structure of the tables. To create a school registration system, for example, a designer might create a large table containing a row for every student. Such a table would require columns for data about the students (such as ID number), classes registered for, dates and times of the student's classes, class locations and teacher for each class. Such a table is easy to understand, but would waste space repeating data items such as a teacher's name in row after row of students registered for the same class.

Relational database management systems (RDBMS) were developed in the 1970's to provide database designers with a method of efficiently organizing data in an abstract form that takes advantage of the natural relationship of data items to each other. E. F. Codd's idea to organize data by relationships separate from its physical storage method was revolutionary. A relational database provides a more flexible solution in part because the abstraction created a more maintainable and efficient data model. For example, a database designer could create a database design (schema) that represents a school registration system by placing data regarding students in one table, teachers in another table, classes offered in a third table and class registrations in a fourth table. Each table would have columns (attributes) representing only the kinds of information relevant to the data stored in that table. The data itself would be stored in table rows (records). In a given record, the attributes may be referred to as fields of the record. Thus, the student table would have one row for each student; the teacher table would have one row for each teacher; and so on. Each student record would have fields for a student ID number and student name.

Figure 1:
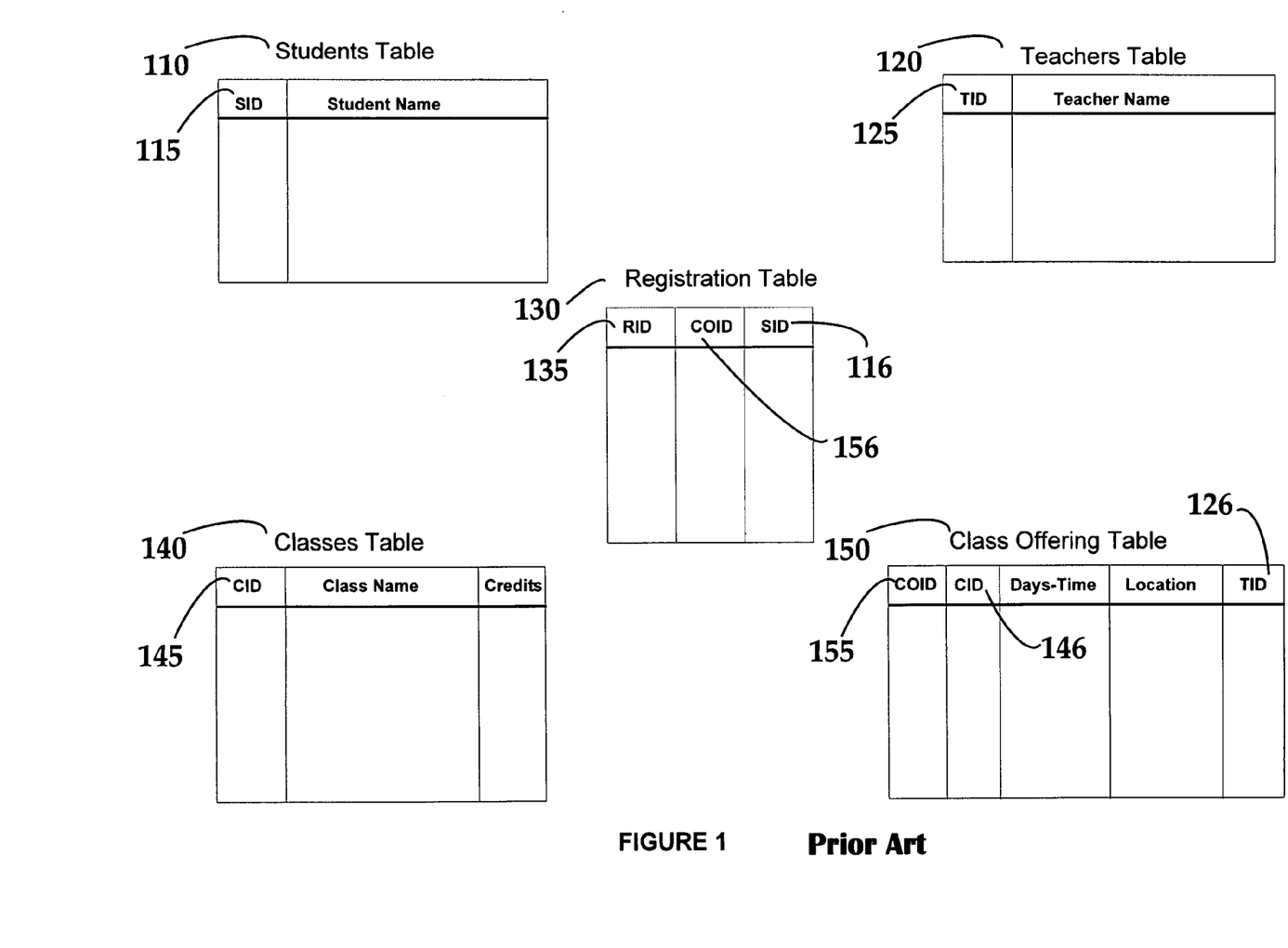
FIG. 1 illustrates a traditional RDBMS for a student registration system.

FIG. 1 illustrates a relational database schema for a simplified school registration system. The design reduces storage and highlights the relationship between the various data items. Because multiple students will register for the same class, information about the class is not required in each registration record; instead, only a reference (pointer) to the class information is required. Computer memory need not be wasted on placeholders or repeated data. Each table in the relational model includes a small primary key field that makes each row of the table unique, even if a student, for example, unintentionally registered for the same class twice. In FIG. 1, attributes 115, 125, 135, 145, and 155 represent primary key fields.

During design or maintenance it may become apparent that a one-to-many relationship is required between data items in a record. Typically, the solution is to break up such data into separate tables. Unfortunately, this solution may cause the relationship between the records to be become obscured The RDBMS designer solves this problem by including "foreign keys" as well as primary keys in the record of the new table. While a primary key makes a row unique, a foreign key relates the data in a row of one table to data in a row of another table. In an RDBMS a table is also referred to as a relation. Thus, in Registration Table 130, RID 135 is a primary key, while COID 156 and SID 116 are foreign keys that relate each registration record to a student (a record in Student Table 110) and a class offering (a record in Class Offering Table 150). Class Offering Table 150 contains primary key COID 155, and foreign keys CID 146 (from Class Table 140) and TID 126 (Teachers table 120). This schema, when populated with data, can produce a course catalog report (using Classes Table 140 and Class Offering Table 150), a Teacher schedule (using Teachers Table 120 and Class Offering Table 150), a student schedule showing classes, class titles, credits, class location, and teacher's name (using all tables 110, 120, 130, 140 and 150), all with a minimum of duplicated data and wasted space.

A database designer generally creates a database schema, such as that illustrated by FIG. 1, manually. The designer must gather information regarding all the required reports, data available, import and export requirements and the relationships between the data items and then must synthesis the information into a database schema such as that depicted in FIG. 1. For large databases with complex relations, schema design may require a team of designers with sophisticated design tools and a significant amount of design time. Each relation and attribute will be described in a data dictionary and individually instantiated.

Traditionally, the definition of a set of related fields for a conventional database table is neither reuseable nor portable. Neither does current schema design systems support flexible or extensible user defined data constructs. When a designer creates a database schema, creates tables to support the schema, and then populates the tables with data, the design becomes fixed. If the database design or organization must later be changed, it will often require export of all the data, redesign of the database, re-creation of the tables and importation of the data into the new schema—if such an operation is even practical at all. Thus, RDBMS schemas for large database systems are complex to reuse and complex to port from one system to another. Even mining data from a large system to import into an alternative schema can be an overwhelming task. Yet today, database evolution and sharing of data between unrelated databases is an essential part of the way we work and do business.

Figure 1A:
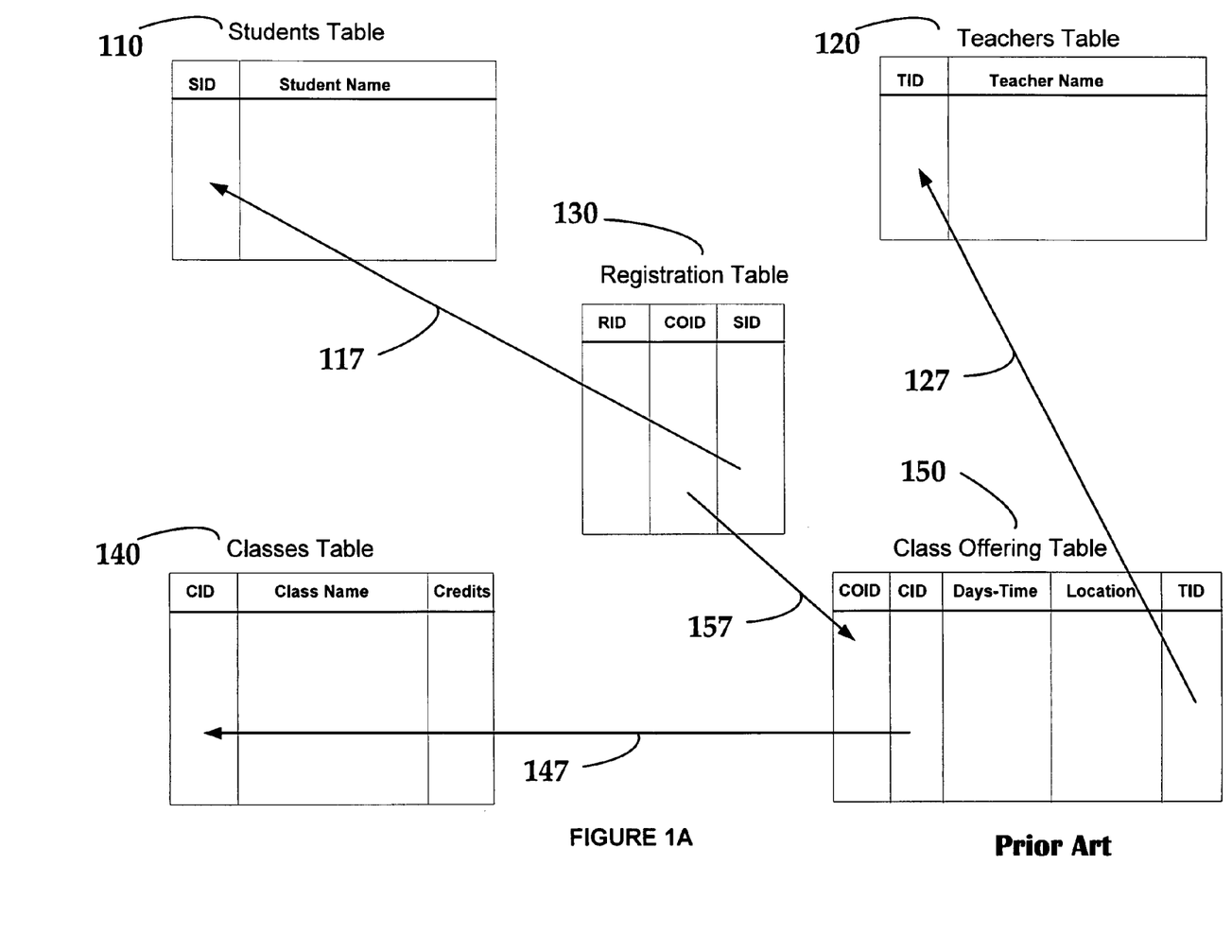
FIG. 1A illustrates the backward-linking data references of a traditional RDBMS system.

Various approaches to managing data import for large databases into RDBMS systems have been attempted, but all suffer from an inherent drawback of the RDBMS concept—that the data relationships in an RDBMS are not exposed from the source to the destination. FIG. 1A illustrates the direction of relationships in the example of FIG. 1. A designer maintaining Class Offering Table 150 is not exposed to the fact that COID attribute 155 is relied upon by Registration Table 130 through reference 157. The same can be said for relations 117, 127, and 147. Thus, the dependency of one table on another is obscured. Further, the view presented to a designer is a "decomposed" view of all the records of one table or all the records of another table. When designs include teams of designers and hundreds of tables, this lack of visibility becomes a disadvantage.

Figure 2:
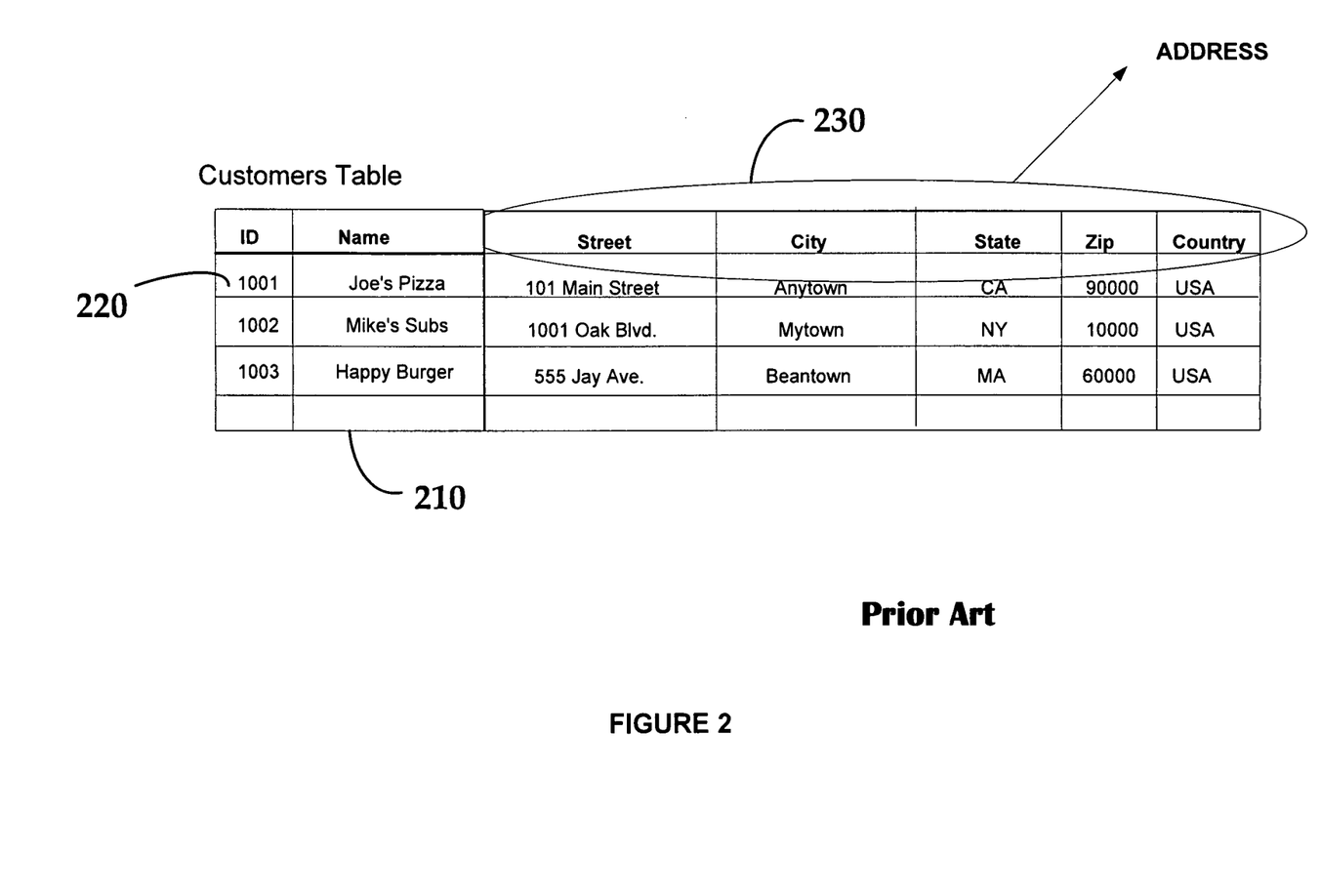
FIG. 2 illustrates a database schema for a contact management system comprising a single table for customer name and address.

Another disadvantage of a traditional RDBMS schema approach is that, in many instances, data relationships in the real world are nested by nature. In a contact management system, a single contact may have more than one address (business, home, mailing, billing, and shipping, for example) and phone number, email account and reminder date associated with the single entry. FIG. 2 illustrates a simple contact management system in an RDBMS. Each Customer has an identifier (ID 220), a name, street, city, state, zip and country. However, Customers Table 210 cannot support allowing Customer 220, Joe's Pizza, to have two addresses—one for delivery and one for billing, for example.

Figure 2A:
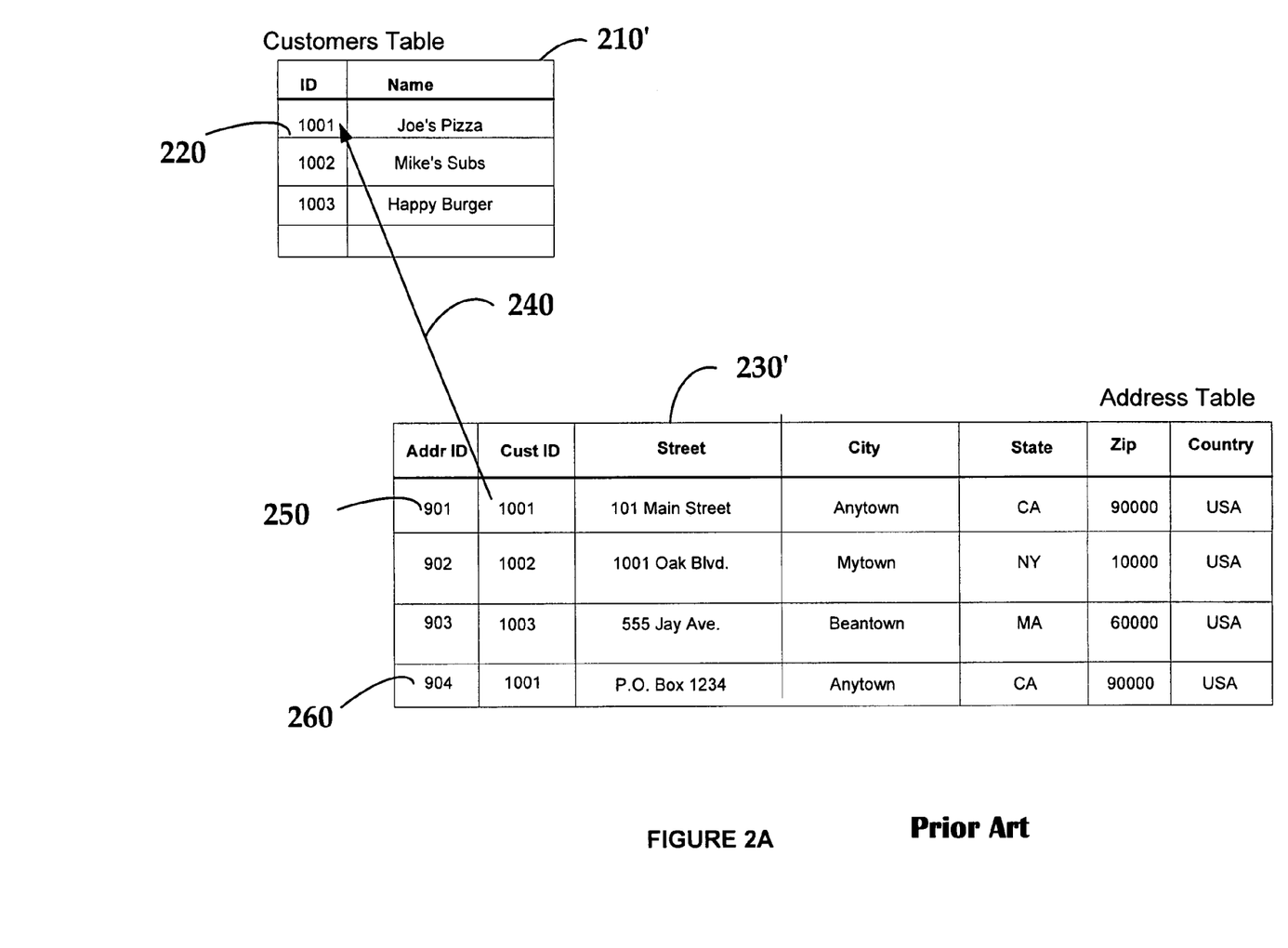
FIG. 2A illustrates an RDBMS design approach where the table of FIG. 2 has been divided into two tables with primary and foreign keys.

A traditional design solution would break the relation into two tables to allow the data to have a one-to-many relationship between some information and other information. FIG. 2A illustrates this traditional solution. Customers Table 210' now has two attributes (columns), a primary key and a customer name. Address Table 230' contains the fields removed from Customer Table 210 of FIG. 2, with the addition of the foreign key attribute, CustID. Now, a search for Joe's Pizza (CustID 260) will return two entries from Address Table 230': Row 250 (Addr ID 901) and Row 260 (Addr ID 904), because both have a matching CustID 220 (containing 1001.) Ideally, at least one additional attribute would be added to Address Table 230', not shown in the Figure, to indicate the purpose of the address stored in each row of Address Table 230'.

At least one disadvantage of this traditional approach is that there is no exposure for an observer of Customers Table 210' to the relationship of customer name and customer address because of the RDBMS primary key-foreign key design approach. While this lack of visibility seems trivial in this example, in a database with hundreds of tables the lack of exposure may cause errors in the maintenance of the database. Furthermore, the designer viewing either table sees a "decomposed" view of all the records of one table or all the records of the other table.

For an RDBMS containing millions of records, the problems of expansion and maintenance are only amplified. Traditional RDBMS systems and techniques may be insufficient to produce a manageable and maintainable design for very large databases. Yet many businesses would like to be able to automatically add new supplier, customer, and product data, for example, to a very large RDBMS. Such data is often available in formats such as eXtensible Markup Language (XML), Unified Modeling Language (UML), Hypertext Markup Language (HTML), comma separated variable format, tab-delineated text, Data Interchange Format (DIF), electronic spreadsheet formats, and many others. However, this data generally reflects the structure of the source database, which may be different from that of the destination. It would be advantageous to be able to insulate the importer from the schema of the destination database. This may be challenging in very large systems, however, because it places the burden of understanding and establishing the hierarchical nature of the data on the importing program. The importing program must decompose the source data into tables and discern and establish the "backward referencing" relationships (parent record primary key as a foreign key in the child) required of an RDBMS database, such as those like Relationship 240. This could require multiple passes over the data. With very large amounts of data, such limitations may be a significant obstacle to correct data import, schema expansion and/or maintenance of the database.

Thus, for at least the limitations described above, there is a need for a reusable custom-defined nestable data construct for use in database schema design. Ideally, such a construct would comprise a customizable compound user-define data type. A system embodying such a construct would allow a database designer to define a customizable compound record template that groups together and names a set of fields into a nestable, reusable object or type definition that describes or reflects the relation between the fields, without requiring the type to be instantiated into a table. The construct would not require the designer to redesign or rebuild existing tables when the compound data type is changed, but would instead propagate the change transparently. Finally, the construct would be nestable to increase the ability to decompose data relationships and reuse definitions.

It would also be advantageous to be able to automatically generate and/or expand a very large database using imported data using a customizable compound user-defined data type to more naturally represent hierarchal data relationships. However, automating such tasks requires tools capable of automatically interpreting data relationships, generating an appropriate database schema, and then populating that schema with the nested data. For at least the limitations described above, a system, method and structures for a reusable custom-defined nestable compound data type for construction of database objects would be advantageous.

BRIEF SUMMARY OF THE INVENTION

To overcome the limitations in the prior art, and to overcome other limitations that will become apparent upon reading and understanding the present specification, various embodiments of the invention, presented in conjunction with the following drawings in which one or more embodiments are illustrated, describe a system, method and structures for a reusable custom-defined nestable compound data type for construction of database objects for use in database schema design.

The reusable custom-defined nestable compound data type for construction of database objects, herein referred to as a "Tuple." Tuples of one or more embodiments of the invention provides advantages over traditional non-reusable structured tables of RDBM systems alone. In one or more embodiments of the invention, a Tuple may be understood as a named set of related fields grouped together into a reusable object or type definition describing a particular data object or type. For example, an Address Tuple might consist of the following related fields: Address, Street1, Street2, City, State, Zip, and Country. A Tuple definition may further be understood as the definition of a table without the actual table itself. More specifically, just as the definition of every table effectively groups together and names a set of related fields (where the records in that table conform to that type definition), so to may a Tuple definition, but without instantiating the table to store the Tuple records.

Tuples of one or more embodiments of the invention may be thought of in part as a generalized form of the custom compound data type found in one or more commercial database systems. Compound data types may be used to model various "exotic" data structures, such as flexible hierarchies and networks, in database schema. Thus, Tuples may be understood as a form of "data type" that may be used to instantiate structures that support the creation of nested records highlighting the relationship between parent records and child Tuple sub-records.

In overview, each Tuple of one or more embodiments of the invention is described first as a reusable definition of related data. This Tuple definition (type) may then be applied to a field in a table definition, creating a field definition. When a table is created (storage is allocated) for the table the Tuple field definition becomes instantiated as well. When data is added to a table containing a Tuple field definition, a private Tuple record is created to contain the data.

Multi-valued (multi-instance) Tuple fields are also within the scope of one or more embodiments of the invention. The structures of one or more embodiments of the invention support defining Tuple Fields as multi-valued to allow, for example, multiple addresses for a customer (physical, delivery and billing), multiple contacts for a customer (sales agent and account representative) and multiple phone numbers for a contact (office, home and mobile) illustrates the advantages of nested and reusable Tuple definitions.

A traditional database schema might break each data item into separate tables, using primary and foreign key relationships to relate the data items. However, this approach loses sight of the relationships of the data. By contrast, the system, method and structures for Tuples of one or more embodiments of the invention manifest this relationship in a way that may be more consistent with a semantic rather than relational model, thereby highlighting the relationship between parent records and child Tuple sub-records. Specifically, the Tuple exposes the relationship from each parent record to its one or more child records by appearing explicitly as a field in the parent rather than as a foreign key field of the child, where the child records are shown grouped with and owned by each corresponding parent record.

Thus, in light of the various embodiments of one or more embodiments of the invention described and implied herein, it may be noted that Tuples and Tuple records may provide improvement over traditional database schema design capabilities, including: grouping data items; reusable definitions; encapsulation; containment and ownership of data; allowing nesting of structures; multi-valued entries and providing XML compatibility. The system, method and structures of one or more embodiments of the invention provide a clear advance over previous systems of defining structures in RDBMS schema. These and other advantages of Tuples are further described herein.

BRIEF DESCRIPTION OF THE DRAWINGS

The above and other aspects, features and advantages of one or more embodiments of the invention will be more apparent from the following more particular description thereof, presented in conjunction with the following drawings wherein.

DETAILED DESCRIPTION

A system, method and structures for a reusable custom-defined nestable compound data type for construction of database objects will now be described. In the following exemplary description, numerous specific details are set forth in order to provide a more thorough understanding of embodiments of the invention. It will be apparent, however, to an artisan of ordinary skill that one or more embodiments of the invention may be practiced without incorporating all aspects of the specific details described herein. In other instances, specific features, quantities, or measurements well known to those of ordinary skill in the art have not been described in detail so as not to obscure one or more embodiments of the invention. Although numerous examples of the invention are set forth herein, the claims, and the full scope of any equivalents, are what define the metes and bounds of the invention.

Figure 3:
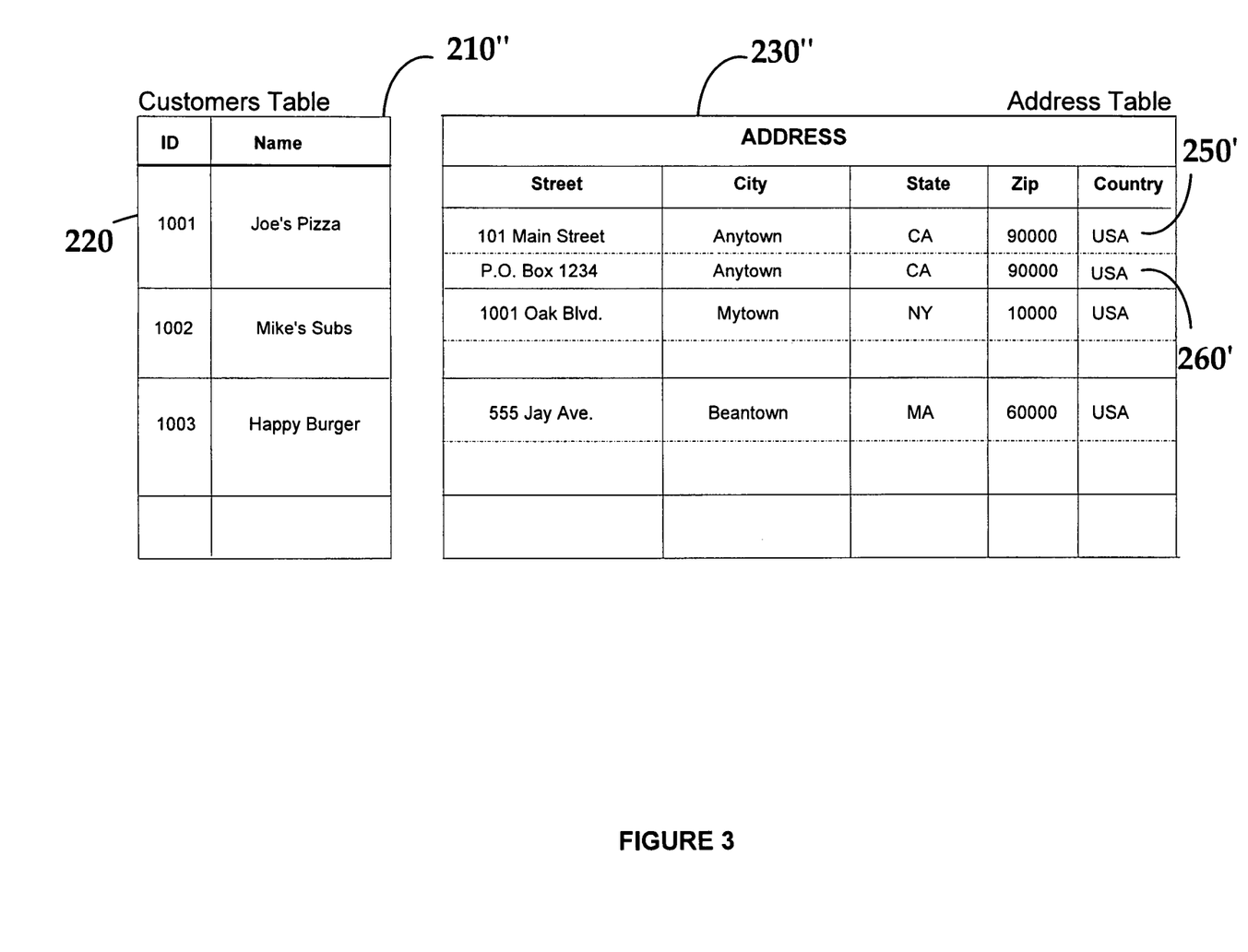
FIG. 3 illustrates an abstract representation of a theoretical version of the table of FIG. 2, further configured to permit two addresses per customer while retaining the exposure of the relation between customer and addresses.

FIG. 3 illustrates an abstract representation of a theoretical RDBMS version of the table of FIG. 2, further configured to permit two addresses (Row 250' and Row 260') per Customer 220 while retaining the exposure of the one-to-many relationship between customer records and addresses. However, the table design of FIG. 3 would waste significant memory if many of the customers use only one address. FIG. 3, however, illustrates the natural nested primary key relationship from the records of the Customer Table 210" to those of the Address Table 230". Further, in a traditional primary key/foreign key relationship between the records of two tables, the records of the primary table (210") control the lifetime and ownership of the records in the secondary table (230").

It would be an advantage to manifest the relationship between the rows in a semantic rather than a relational model to highlight the relationship between parent records and child sub-records. Specifically, it would be advantageous to expose the relationship from each parent record to its one or more child records by representing the relationship explicitly as a field in the parent rather than as a foreign key field in the child, where the child records are shown grouped with and owned by each corresponding parent record.

What is a Tuple?

One or more embodiments of the invention define a system, method and data structures to support a solution providing the above desired advantages. The term "Tuple" is used herein in part as a synonym for the ideas and implementation of the one or more embodiments of the invention. The term "Tuple" has sometimes been used in the art of mathematics and computer programming to have a different meaning, such as, "an ordered set of data constituting a record; a data structure consisting of comma-separated values passed to a program or operating system," or something similar.

The term "Tuple" as used herein is intended to indicate a reusable, custom-defined nestable compound data type of one or more embodiments of the invention. The term "nestable," as used herein, refers to the overall concept of a multilevel hierarchy of related private sub-records. As used herein, the term "private" refers to data accessible exclusively by and through a particular parent record instance, said parent instance controlling the very existence of the child record. The term "data structure," as used herein, means the physical implementation of a data model's organization of data, where a data model is a framework for organizing and representing information used by a computer application program captured in a computer-readable media.

Understanding Tuples

Traditionally, a database table comprises a set of records where each record consists of a set of fields (attributes). A table definition generally names the table, defines a set of attributes for each record in the table giving each field a name and type, and creates a storage location for each of the records. For example, in Customers Table 210 of FIG. 2, each customer (row) has an ID, a Name and an Address consisting of five additional fields containing address information.

The reusable custom-defined nestable compound data type for construction of database objects of one or more embodiments of the invention provides advantages over traditional non-reusable structured tables of RDBM systems alone. Tuples of one or more embodiments of the invention may be thought of part as a generalized form of the custom compound data type found in one or more commercial database systems. Compound data types may be used in database schema to model various "exotic" data structures, such as flexible hierarchies and networks. Thus, Tuples may be used to model such structures, but in a more natural form. Tuples share the characteristics of a "data type" in that they may be used to instantiate structures that support the creation of nested records highlighting the relationship between parent records and child Tuple sub-records.

In one or more embodiments of the invention, a Tuple may be understood as a named set of related fields grouped together into a reusable object or type definition describing a particular data object or type. For example, an Address Tuple might consist of the following related fields: Address, Street1, Street2, City, State, Zip, and Country. A Tuple definition may further be understood as the definition of a table without the actual table itself. More specifically, just as the definition of every table effectively groups together and names a set of related fields (where the records in that table conform to that type definition), a Tuple definition may too, but without instantiating the table to store the Tuple records.

In overview, each Tuple of one or more embodiments of the invention is described first as a reusable definition of related data. This Tuple definition (type) may then be applied to a field in a table definition, creating a field definition. When a table is created (storage is allocated) for the table the Tuple field definition becomes instantiated as well. When data is added to a table containing a Tuple field definition, a private Tuple record is created to contain the data. Further explanation of the relationships between Tuple definitions, Tuple field definitions, Tuple instances and Tuple records are described in conjunction with FIG. 5, below.

Tuples are thus user defined reusable "types" and data structures instantiated from those types for defining database objects under the guidance of the concepts of the one or more embodiments of the invention. Because Tuple may be structured as a "type" Tuples are both reusable and editable, as Tuple instantiation is governed by a specific but abstract definition. Further, by existing as a field in the parent table instead of as a foreign key in a child table, Tuples advantageously expose the relationship from each parent record to its one or more child records. In one or more embodiments of the invention, child Tuple records would be private to the parent record.

Tuple Terminology

As used herein, the following terms may be understood to have the described meanings in one or more embodiments of the invention:

TABLE 1

| Tuple Terminology | |
| --- | --- |
| Tuple | A group of related fields |
| Tuple definition | A named Tuple definition which specifies the related fields |
| Tuple member field | A field of a Tuple. One of the fields specified in the Tuple definition |
| Tuple type | The named type of a field of type Tuple |
| Tuple field | A field of type Tuple that contains Tuple records |
| Tuple instance | The set of Tuple records resulting from a Tuple field |
| Tuple record | One of the subrecords of type Tuple residing in the Tuple instance. |
| Tuple Field Value | The set of Tuple records in a Tuple field for a single parent records |
| Tuple Value | The set of values comprising a single Tuple record |
| Multi-valued Tuple field | A multi-valued field of type Tuple. |

Using Tuples in Schema Design

Figure 4:
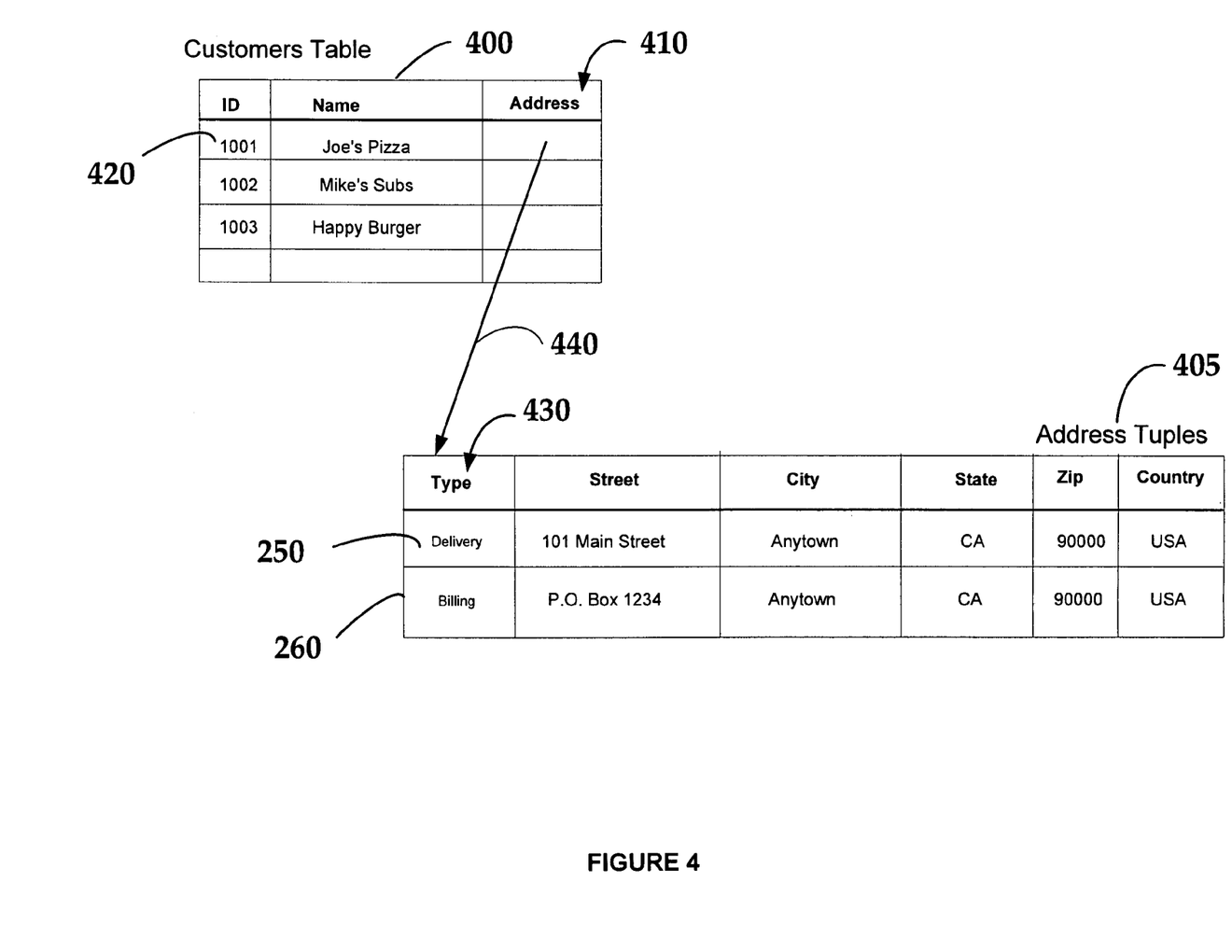
FIG. 4 illustrates an exemplary schema wherein database tables containing customer address information comprise a reusable custom-defined nestable compound data type with forward referencing in the nature of one or more embodiments of the invention.

FIG. 4 illustrates the Customers Table of the contacts database example of FIG. 2 and FIG. 3, reconfigured to use the Tuples concept of one or more embodiments of the invention. Customers Table 400 represents the primary table, while Address Tuple 405 replaces the second table from FIG. 2. Customers Table 400 contains attribute Address Tuple Field 410, which stores the information about the Tuples associated with the data records of Customers Table 400, among other information as detailed below. For example, Data Record 420 for customer Joe's Pizza contains Address Tuple Field 410, which comprises the relation 440 associating Data Record 420 with Data Record 250, the instantiation of Address Tuple Field 410 for Data Record 420. Type field 420 may be used to identify the Tuple definition of the row that contains it.

Tuples Implementation Example

Figure 5:
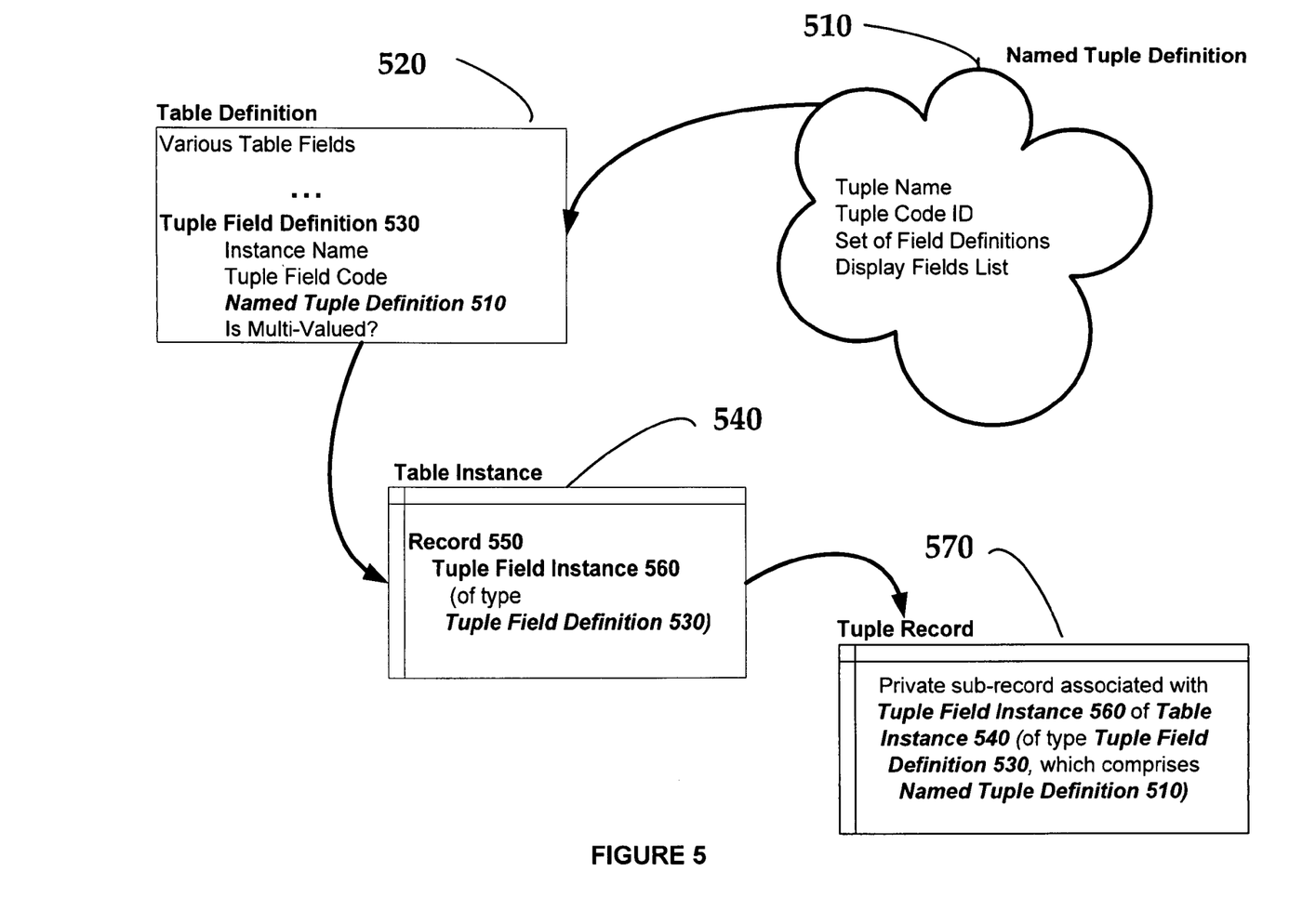
FIG. 5 illustrates the relationships between a Tuple definition, a table definition, a table instance and a Tuple record in one or more embodiments of the invention.

FIG. 5 illustrates the various stages of implementation of a Tuple in one or more embodiments of the invention. A Tuple may first be conceived as a data "type," as that term may be used in structured programming languages. A schema designer may recognize an advantage to accessing some data in a database in a form that takes advantage of the pure relational aspects of a relational DBMS, with the added ability to reuse the definition in multiple tables across a database schema.

As introduced above, a Tuple may begin as a set of field definitions for data elements with some relation between them. For example, the contact management information of the prior example would contain field definitions for Street, City, State, Zip and Country for an Address Tuple. Metadata to implement the Tuple may include a Tuple Name, a unique identifier for the Tuple for the Tuple Definition, called a CodeID in one or more embodiments of the invention, a set of field definitions, and a list of those fields that may be displayed with the relation. Named Tuple Definition 510 of FIG. 5 represents a un-instantiated Tuple in one or more embodiments of the invention. Table Definition 520 may define a table where each relation contains various fields.

As in one or more embodiments of the invention, for example, an embodiment may represent a table of product vendors. Each product vendor may have a contact address and a billing address. Thus, it is an advantage to define "address" as a Tuple. An Address Tuple definition (an embodiment of Named Tuple Definition 510), may be created with Tuple Member Fields such as Tuple Name, Tuple CodeID, Field Definitions and Display Fields List. A Product Vendor table definition (an embodiment of Table Definition 520) may be created including Various Table Fields, such as the Product Vendor's Name for example, and including one or more Tuple fields defined as Tuple Field Definition 530, such as for example to represent one or more Product Vendor Address Tuples. Table Definition 520 may contain one or more Tuple Field Definitions 530, each comprising a Tuple Instance Name, a Tuple Field Code, an instance of Named Tuple Definition 510, and in one or more embodiments, a Boolean or other form of indicator indicating that Tuple Field Definition 530 may be multi-valued. A positive multi-valued indicator, for example, may indicate multiple instances of the Tuple Field Definition 530 for a given row of Table Instance 540 in one or more embodiments of the invention. However, any form and value of indicator known to those of skill in the art may be used to represent a multi-valued Tuple.

Where Table Definition 520 exists, Table Instance 540 may be created as storage for that data. Table Instance 540 may include one or more records (relations) that include instantiations of Tuple Field Instance 560 of type Tuple Field Definition 530. Continuing the example, a Product Vendor Table Instance may contain a Product Vendor Address field. When Table Instance 540 is populated with data that would include data for Tuple Field Instance 560, Tuple Record 570 may be instantiated as a private sub-record of Tuple Field Instance 560 to store the information described in Tuple Field Definition 530. Thus, a Tuple of one or more embodiments of the invention may be a "type" and an instance. A general purpose or specialized computer system programmed to support Tuple types and structures described herein is a system in the scope of one or more embodiments of the invention.

The Tuple Field in Table Instance 540 may be implemented using any number of data structure techniques known to those of skill in the art. For example, Address Tuple 440 (a Tuple Field) may contain a code identifying its associated private Tuple sub-records 250 and 260, where all Tuple records of a given type are allocated physical storage associated with a single table structured to include the Tuple instances. Alternatively, Address Tuple 440 may contain a linked list of pointers to each instance of its sub-records, or more simply a pointer to a linked list of instances. Implementing the Tuples concept of one or more embodiments of the invention using other data structure types and models known to those of skill in the art is also within the scope of one or more embodiments of the invention.

In one or more embodiments of the invention, a Tuple record may be stored in a SQL database, for example, as a hierarchy of a single Tuple record plus additional Tuple records in dependent tables. In one or more embodiments, Tuple records may also be stored in space and speed optimized structures, as understood by those of skill in the art.

Thus, the Tuple concept of one or more embodiments of the invention provide a way to effectively group together and name a set of related fields into a record, where each such record conforms to the user defined Tuple type definition but without requiring the actual storage container for the records of the table to be instantiated before needed.

Nested Tuples Example

Figure 6:
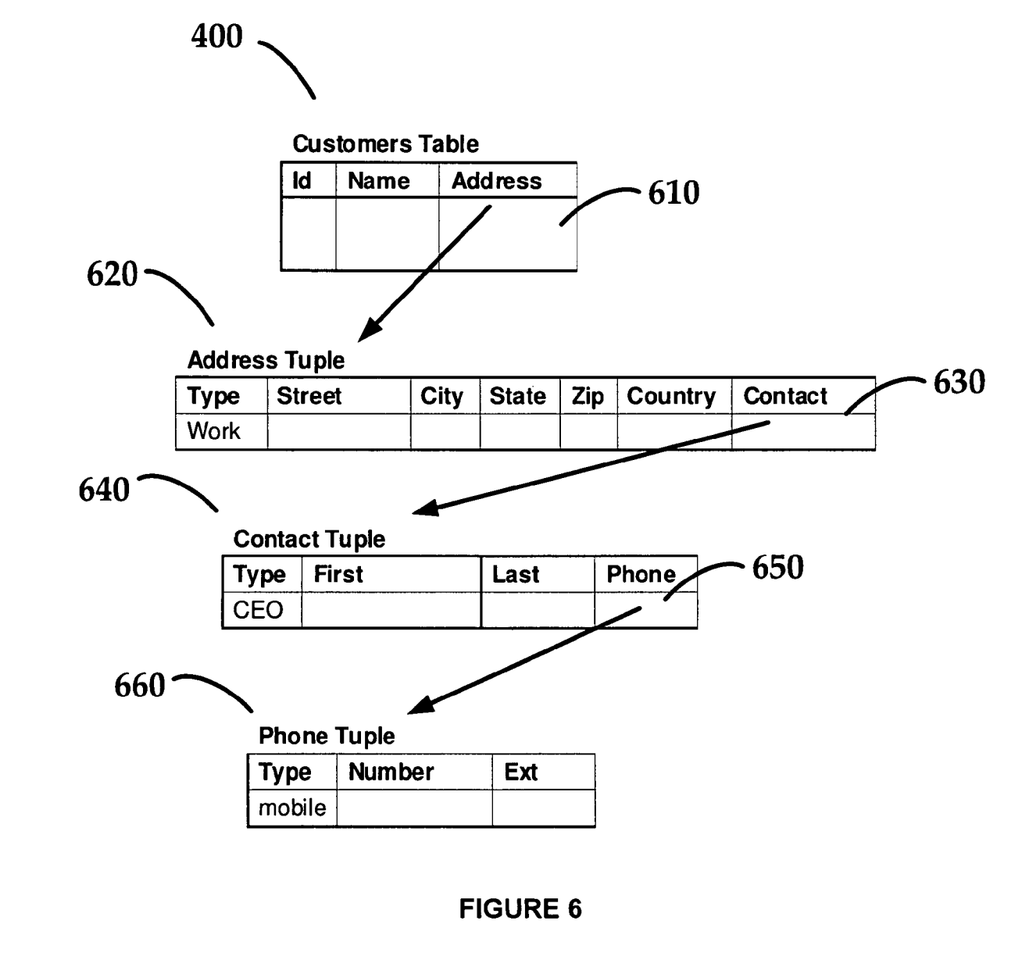
FIG. 6 illustrates nested Tuples in one or more embodiments of the invention.

FIG. 6 illustrates an exemplary schema for using nested Tuples to manage address data. For example, address data, as discussed above, often occurs in many different tables in business RDBMS systems. Contact information for customers, vendors, sales people, suppliers—virtually every entity in the production and sales chain, may be essential information to be associated with various records in multiple tables. Further, addresses frequently have multiple contact information entries, such as work, home, billing, shipping, and delivery information. Within a given address entry, such as a customer's address, there may be multiple contacts that must be maintained, such as a CEO, sales representatives, account agents and product specialists. While all these contacts may work at the same location, each may have, for example, more than one contact phone number.

A traditional database schema might break each data item into separate tables, using primary and foreign key relationships to relate the data items. However, this approach loses sight of the relationships of the data. By contrast, the system, method and structures for Tuples of one or more embodiments of the invention manifest this relationship in a way that may be more consistent with a semantic rather than relational model, thereby highlighting the relationship between parent records and child Tuple sub-records. Specifically, the Tuple exposes the relationship from each parent record to its one or more child records by appearing explicitly as a field in the parent rather than as a foreign key field of the child, where the child records are shown grouped with and owned by each corresponding parent record.

Thus, using the Tuple structures and methods of one or more embodiments of the invention, Address, Contact, and Phone data may be gathered into nested Tuples. Exemplary Customers Table 400 of FIG. 6 contains Address Tuple Field 610. Address Tuple Instance 620, a "work" type, may contain the business address of the customer. Address Tuple Instance 620 contains a nested Tuple field, Contact Tuple Field 630. Contact Tuple Instance 640 may also contain a nested Tuple field, in this case Phone Tuple Field 650. Phone Tuple Instance 660, perhaps a mobile type Tuple, may not require a nested definition, bringing the nested hierarchy to an end.

The ability of Tuples to contain nested Tuple fields reveals that Tuples may preserve the two-dimensional relationships among the data. For example, Customers Table 400 may be viewed as a first tier, Address Tuple 620 as a second tier, Contact Tuple 640 as the third tier, and so forth. In essence, Tuple may be thought of revealing the two-dimensional relationships among the various data. Likewise, in one or more embodiments of the invention, a Tuple may encompass higher dimensional relationships among the data. For example, if Address Tuple Field 610 was associated with two or more Address Tuples, the relationship among the data may be thought of as being a three-dimensional relationship. In one or more embodiments of the invention, this concept may be expanded to even higher dimensions if multiple Address Tuples each branch off into other multiple Contact Tuples, and so forth for example.

Multi-Value Tuples

Multi-valued (multi-instance) Tuple fields are also within the scope of one or more embodiments of the invention. If Address Tuple Field 410 was defined as multi-valued, then Customers Table 400 could store multiple Address Tuple records per Customers Table record, creating a one-to-many relationship between Customers Table records and its private Address Tuple records. As another example, each Tuple Field 610, 630, and 650 may be defined as a multi-value Tuple. The structures of one or more embodiments of the invention supports defining Tuple Fields as multi-valued to allow, for example, multiple addresses for a customer (physical, delivery and billing), multiple contacts for a customer (sales agent and account representative) and multiple phone numbers for a contact (office, home and mobile) illustrates the advantages of nested and reusable Tuple definitions. The system, method and structures of one or more embodiments of the invention provide a clear advantage over previous systems of defining structures in RDBMS schema.

Reusable Tuples

An object-oriented Tuple may be formed by a named set of related fields that are grouped together into a reusable object or data type. An object-oriented Tuple may enjoy many of the advantages of other object-oriented structures. For example, Tuples may be defined once and reused multiple times in multiple places in a database schema, as a "data type" may be reused in a structured programming language, or as a "class" may be reused in an object-oriented programming language. Reusable Tuple types therefore expand the ability of database designers to reuse designs and to reuse elements within a design.

In one or more embodiments of the invention, Tuples may be nested to form hierarchal one-to-many relationships. Thus, unlike the predefined compound data types available in some database schema design systems, Tuples provide the capability for complex user-defined compound data type for database schema design.

Tuples and XML

As a user-defined nestable data type, the Tuple concept of one or more embodiments of the invention may be used to represents XML data within a schema, allowing a database to faithfully represent any XML Schema Definition (XSD), because one or more embodiments of Tuples are naturally compatible with the user-defined reusable, nestable, and repeatable attributes of XML. Thus, Tuples may be a natural way of representing Extended Markup Language ("XML") data. In one or more embodiments of the invention, the relationships between the parent record and Tuple sub-records are explicit.

Other advantages of Tuples include data encapsulation, containment, multi-instance (nesting), data grouping, and the ability to attach additional properties to the definition of a Tuple. Reusable Tuple types therefore expand the ability of database designers to reuse designs.

Tuples and Attributes

Tuples may be applied to attributes within a database taxonomy. Tuples permit the schema designer to create a varied schema that better reflects the true relationships between data. For example, for products described by data with many exclusive options, a traditional design approach will produce an inefficient sparse matrix. Consider clothing products where each similar item may be offered in multiple styles, sizes and colors. It may be a design requirement to identify each item in stock precisely. However, creating attributes for each possible value for each of these characteristics of the product is inefficient due to the significant number of permutations. Tuples, using the system, methods and structures of one or more embodiments of the invention, provide an elegant solution that allows a row to efficiently represent the many variations as multiple Tuple sub-records of a primary record.

Figure 7:
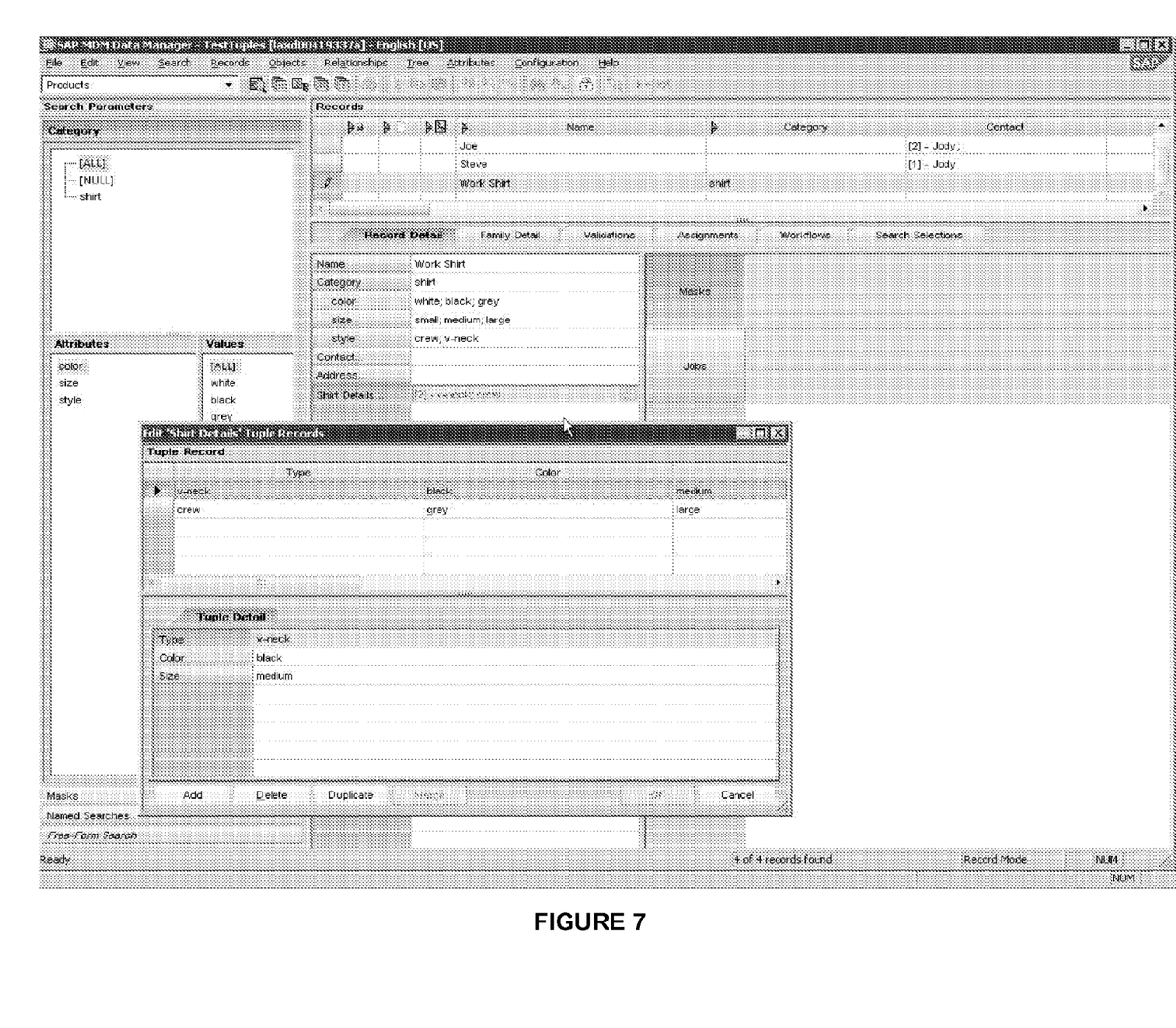
FIG. 7 illustrates a screen capture of a user interface for a database schema designer, where the computer program illustrated enables one or more embodiments of the invention.

FIG. 7 illustrates an exemplary graphic user interface for just such an example in an exemplary graphic user interface (GUI) to show the relationships between Tuples, Tuple fields, and Tuple instances described above and particularly in FIG. 5. As can be seen in FIG. 7, a Tuple instance, "Work Shirt," is described as of Category "shirt." The Field Detail (properties) tab for instance Work Shirt indicates the record contains a multi-value Tuple field labeled "Shirt Details," which has two private Tuple records associated with it.

Both private Tuple records may be seen in the "Edit 'Shirt Details' Tuple Records property dialog displayed in FIG. 7. The first Tuple record is of type v-neck, and the second of type "crew." The v-neck shirt has a color of "black" and a size of "medium." Thus, data regarding each shirt in stock may be efficiently stored using such structures and display designs. Practically, the data may be imported into a database supporting Tuples in any data format that may be used for data transport. Many such formats are familiar to those of skill in the art, such as the popular eXtended Markup Language (XML), Unified Modeling Language (UML), Hypertext Markup Language (HTML), comma separated variable format, tab-delineated text, Data Interchange Format (DIF), electronic spreadsheet formats, and many other structured data formats.

Self-Configuring Applications

One of the flexibilities provided by the Tuple concept of one or more embodiments of the invention is the ability to enable one to build a self-configuring database system. Because Tuples may be nested into a hierarchy, and because Tuples represent a paradigm shift from backward referencing relations such as Relation 240 to forward referencing relations such as Relation 440, parsing structured input data and programmatically generating appropriate Tuple structures to contain that data may be greatly simplified.

In one or more embodiments of the invention, a parser, such as those well known in the art, may be used interpret meta-data and data descriptions (such as XML, comma separated variable, or other form of structured data) to determine data relationships and organization for hierarchical data. If, for example, XML is the source data format, a simple XML parser, of the type well known in the art, may be used to create an XML Document Object Model (XML DOM). In a first pass, such a parser may automatically determine a nested hierarchy of the input data, and from that may generate a corresponding hierarchy of Tuples that faithfully represent the appropriate relations described in the data description, such as, for example, an XML schema definition file (XSD).

The forward referencing, reusable and nestable, nature of Tuples allows the parser to create a data hierarchy as it parses the XML file in a single pass, greatly simplifying the process. Without Tuples such a parser would be required to recursively decompose the meta-data to determine all the relations before generating a schema. This would greatly increase the complexity of the logic of the parser, as well as the storage required to make multiple passes through the XML. Thus, Tuples provide an advantage for the generation of self-configuring database applications.

Advantages of Tuples

Thus, in light of the disclosure described and implied herein, it may be noted that Tuples and Tuple records may provide improvement over traditional database schema design capabilities, including: grouping data items, reusable definitions, encapsulation, containment and ownership of data, allowing nesting of structures, multi-valued entries, and providing XML compatibility. These advantages of Tuples may further comprise:

Data Grouping The definition of a Tuple groups together and names one or more sets of related attributes that describe or compose a particular data object or type.

Reusable Definitions Unlike the traditional approach of designing data definitions explicitly for use in a particular database table, a user specified Tuple may be defined once and reused in multiple places in a database schema. Thus, Tuples in part import the concept of "types" that may be familiar to structured programmers into database schema design, introducing the advantage of express reuse of data definitions for database schema.

Encapsulation: Since Tuples may be defined once and used many times, any change to the structure of a Tuple or to its associated validations or security provisions may be immediately propagated to every instance.

Containment/ownership. In one or more embodiments, Tuple records may be private to and controlled by a parent record, improving reliability. In one or more embodiments, a Tuple appears explicitly as a field in a parent record, highlighting the relationship from the parent record to the Tuple sub-records; this relationship is normally obscured in a traditional RDBMS. In one or more embodiments of the invention, properties may be added to the definition of a Tuple or to its instantiation, which is more natural than the traditional model.

Nesting: The definition of a Tuple may itself contain another Tuple. Thus, one or more embodiments of the invention support deep nesting, which is naturally representative of one-to-many data relationships.

Multi-Valued Entries: A Tuple definition may be multi-valued (multi-instanced). Thus, although private to a parent record, a Tuple field may allow multiple Tuple values in what would traditionally have been represented as multiple rows of data in a child-table. A Tuple may be implemented as a field that instantiates a Tuple "type." Use of this aspect of one or more embodiments of the invention may profitably expose the relationship of dependent data as a field of the parent record rather than as an obscure foreign key relationship in a related table as in traditional database schema design systems.

Defining Tuples as a Compound Data Type

Some database systems support the concept of user-defined data types, allowing a designer to create a "type" with multiple elements. Most commercial SQL systems implement the Data Definition Language (DDL), which allows designers to create new tables and associated elements. The XML Schema definition capability is an example of a DDL (in the context of XML.) Many database systems support proprietary extensions to the SQL DDL. Where those extensions exist, and where they support defining a compound data type, there are advantages to defining Tuples as Compound Data Types. Compound Data Types allows re-use of a Tuple definition for multiple instances of the same compound type at different levels within different objects. This implementation approach may benefit from the following advantages.

Using a user-defined compound data to implement Tuples may provide a consistent, predictable interface to data in each place where it is accessed. A consistent picture of data may simplify reuse of the data and reuse of methods to access the data. Further, the UI controls that directly map to the Tuple data fields may be reused, along with their associated event methods. The same may be true for rules used to validation or match data within the Tuples for data integrity checks. Using user-defined compound data types may also be preferred because it may allow transformation logic that provides persistent storage to be reused. Finally, implementing Tuples as a user-defined compound data type may also allow properties to be attached to the Tuple as a whole. Some examples may include the set of display fields, the set of unique fields, data validation rules on the data members of the Tuple records.

In one or more embodiments, Tuples may be implemented using a nested hierarchical structure, known to those of skill in the art, to represent the Tuple data. As compared to storing using a flat structure, a nested hierarchical structure provides the advantages of eliminating redundancy, which reduces storage requirements, enforcing data integrity between parent and child data elements, allowing optimization of algorithms that perform computations on the data by allowing entire branches of data to be skipped.

Where available, it is preferred to combine defining a Tuple definition with a nested hierarchical structure to create a hierarchical nesting of Tuples that then comprise all or part of a data schema. Nesting Tuple definitions provides advantages such as allowing a complete and logical representation of real world entities, such as for example people, accounts, companies, products and contracts. Such entities may consist of data with complex relationships. Nesting Tuple definitions also provides the ability to configure complex rules for comparison or data integrity based on the entire Tuple hierarchy, such as may be required for self-configuring applications that provide functionality to access and manipulate data as well as additional functionality to enforce rules, run search queries and generate reports.

Rules Governing Tuple Definitions

Not by way of limitation, one or more embodiments of the invention may include one or more type rules for a valid Tuple definition. Such rule may increase the reliability of Tuple structures, improve User Interface design, and insure that all instances of Tuples operate as desired. For example, one or more embodiments may implement Tuple definition rules that comprise: barring cycles within Tuple definitions and Tuple fields; requiring basic properties of the type, such as the elements of Tuple Field Definition 530 to be non-null; and barring calculated fields from Tuple definitions. Other embodiments may use these rules, no rules, or other rules or a combination of rules to circumscribe a legal Tuple definition in a particular embodiment of the invention.

A System Supporting Tuples

Thus, the disclosure, figures and claims herein serve to describe an architecture and design for one or more computer programs capable of providing Tuples to database schema designers as tools by using the system, methods and data structures of one or more embodiments of the invention. Such a computer program or programs may comprise computer-executable instructions captured in a computer readable medium for designing, creating and populating one or more data structures that support one or more embodiments of the invention. A method for creating one or more data structures supporting one or more embodiments of the invention may be created as, for example, an application program, said application program being executable by a data processor, said data processor creating a data structure in a memory coupled to said data processor, said data structure being created from information made available to said application program by said data processor, said method comprising the steps, executed by said data processor, of: creating a parent table in a database, said parent table comprising a first parent attribute configured to contain a reference to at least one row in a child table; and, creating an attribute in a data table of a database representing a relation between data stored in a record of said data table and data stored in another data table of said data base.

The method described here is not limited as to the type of computer it may run upon and may for instance operate on any generalized computer system that has the computational ability to execute the methods described herein and can display the results of the users choices on a display means. The computer typically includes at least a keyboard, a display device such as a monitor, and a pointing device such as a mouse. The computer also typically comprises a random access memory, a read only memory, a central processing unit and a storage device such as a hard disk drive. In some embodiments of the interface, the computer may also comprise a network connection that allows the computer to send and receive data through a computer network such as the Internet. Mobile computer platforms such as cell phones, Personal Desktop Assistants (PDAs), kiosks, games boxes or any other computational device may also qualify as a computer system capable of executing the methods described herein.

One or more embodiments of the invention may be implemented as a method, apparatus, or article of manufacture using standard "programming and/or engineering techniques to produce software, firmware, hardware, or any combination thereof. The term "article of manufacture" (or alternatively, "computer program product") as used herein is intended to encompass a computer program comprising computer executable instructions accessible from any computer-readable device, carrier or media. In addition, the software in which various embodiments are implemented may be accessible through the transmission medium, for example, from a server over the network. The article of manufacture in which the code is implemented also encompasses transmission media, such as the network transmission line and wireless transmission media. Thus, the article of manufacture also comprises the medium in which the code is embedded. Those skilled in the art will recognize that many modifications may be made to this configuration without departing from the scope of one or more embodiments of the invention.

In various embodiments, the specific software instructions, data structures and data that implement various embodiments of one or more embodiments of the invention are typically incorporated in a database management system. Generally, embodiments of the invention are tangibly embodied in a computer-readable medium, for example, a computer memory device and is comprised of instructions which, when executed by a computer processor, causes a computer system to utilize one or more embodiments of the invention. The memory device may store the software instructions, data structures and data for any of the computer operating system, database management system and client application program in semiconductor memory, in disk memory, in some other form of memory known to those of ordinary skill in the art, or in some combination thereof. The memory device may be coupled to one or more processors upon which the instructions and data to implement the computer program product of one or more embodiments of the invention may be distributed. A computer memory device may be a magnetic or optical disk, a flash drive, a thumb drive, a chip, a tape, CD, DVD, or other form of off-line storage, or any other form or location of device or communication mechanism capable of preserving and representing data and software instructions, such as those exemplary removable and installed memory devices indicated in FIG. 8.

Figure 8:
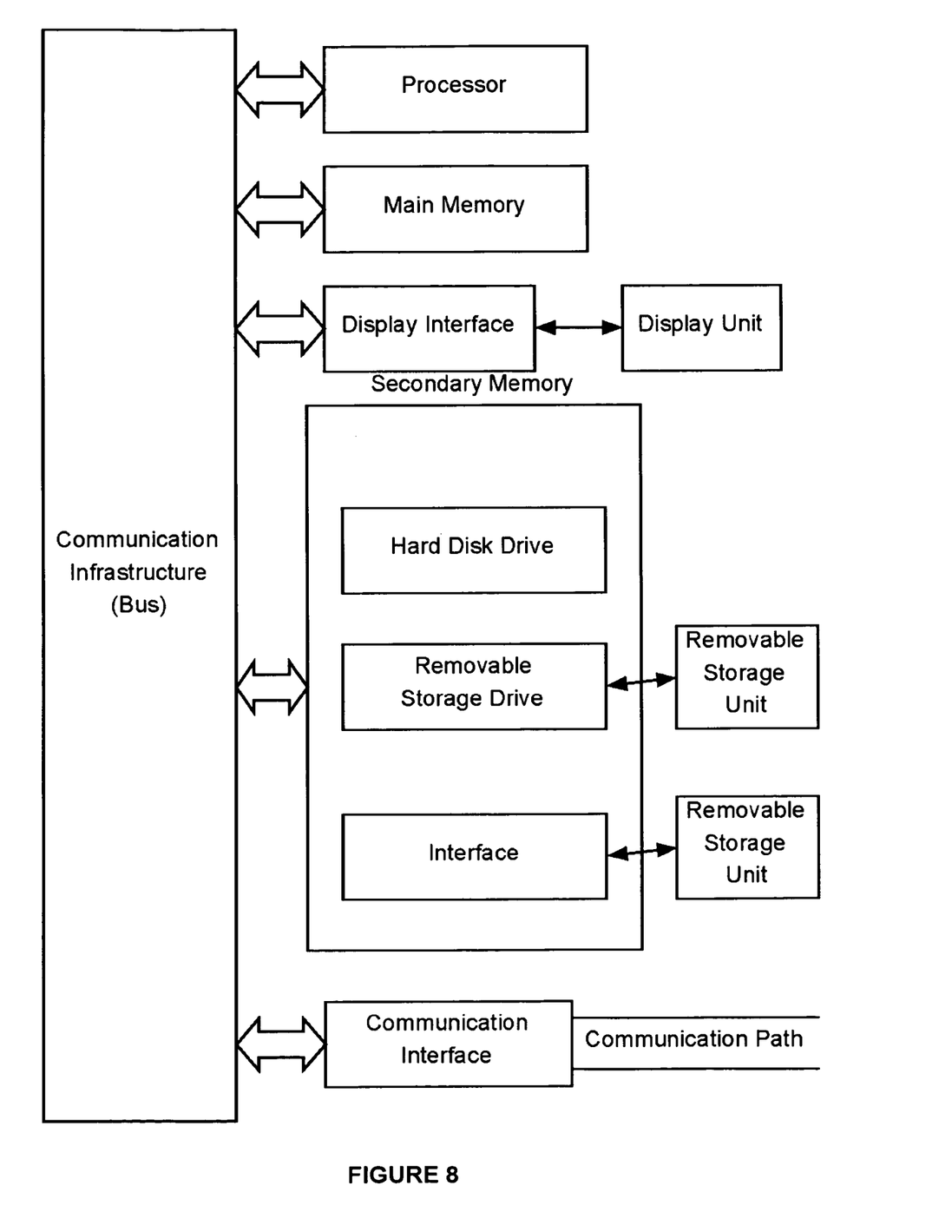
FIG. 8 illustrates an exemplary computer system on which the system, method and structures of one or more embodiments of the invention may be practiced.

The exemplary computer system illustrated in FIG. 8 is not intended to limit one or more embodiments of the invention. Other alternative hardware environments may be used without departing from the scope of one or more embodiments of the invention.

While one or more embodiments of the invention herein disclosed has been described by means of specific embodiments and applications thereof, numerous modifications and variations could be made thereto by those skilled in the art without departing from the scope of the embodiments of the invention set forth in the claims.

What is claimed is:

1. A non-transitory computer-readable medium having stored thereon a storage instantiating compound custom data structure for use in defining a database schema object comprising:
    a set of multi-instance field definitions associated with data elements, wherein the data structure represents a un-instantiated data structure defining a relationship between fields, wherein the data structure is grouped with the field definitions without requiring instantiation of records of a table, and wherein the fields comprise:
    a first field comprising data representing a label of the data structure, the data structure associated with a parent record instance, wherein the private sub-records are grouped and associated with a corresponding parent record and wherein the private sub-records are not accessible through any record instance other than the parent record instance;
    a second field comprising data representing a field code for a reusable custom-defined nestable compound data type wherein the nestable compound data type relates to a multi-dimensional relationship among the data and wherein the nestable compound data type instantiates a second reusable custom-defined nestable compound data type;
    a third field comprising a pointer to a linked list of pointers to each instance of the private sub-records that is associated with a set of related data fields associated with said data structure, wherein the relationship between each instance of the private sub-records and the data structure appears explicitly in the third field without appearing as a foreign key field in the private sub-records; and
    a fourth field comprising data representing a Boolean indicator, a truth value of said Boolean indicator permissive of said data structure being associated with a plurality of private sub-records, wherein the fields are associated with reusable rules to perform validation of data within the data structure by barring cycles and calculated fields within the data structure and to require non-null definitions of the field definitions, wherein the validation is propagated to each instance within the data structure, wherein the data structure is stored in a speed optimized storage, wherein computations are performed on the data to allow data to be skipped to eliminate redundancy, and wherein the data structure is created in a single pass of an XML file.

2. The data structure of claim 1 further comprising an object-oriented data structure.

3. The data structure of claim 1 instantiated in a database table.

* * * * *